United States Patent [19]

Desai et al.

[11] Patent Number: 4,939,600
[45] Date of Patent: Jul. 3, 1990

[54] EFFICIENT HEAD POSITIONER POWER AMPLIFIER

[75] Inventors: Ashok K. Desai, Westlake Village; Russell H. Jacobs, Thousand Oaks; Bipin V. Gami, Northridge, all of Calif.

[73] Assignee: Micropolis Corporation, Chatsworth, Calif.

[21] Appl. No.: 293,818

[22] Filed: Jan. 5, 1989

[51] Int. Cl.$^5$ .............................................. G11B 33/12
[52] U.S. Cl. .................................................. 360/78.04
[58] Field of Search ................. 360/78.04; 336/155, 336/171, 181

[56] References Cited

U.S. PATENT DOCUMENTS

| | | | |
|---|---|---|---|
| 1,813,036 | 7/1931 | Elliott | 336/181 |
| 2,088,454 | 7/1937 | Whisk | 336/181 |
| 2,802,186 | 8/1957 | Dewitz | 336/171 |
| 4,359,674 | 11/1982 | Goton | 318/318 |
| 4,473,811 | 9/1984 | Schauble | 336/181 |
| 4,728,918 | 3/1988 | Neusser et al. | 336/155 |

OTHER PUBLICATIONS

Modern Dictionary of Electronics, First Edition, 1/1962, Howard W. Sams & Co., Entry for "hum-bucking coil".
Unitrode Corp.,/Linear Integrated Circuits; Switched Mode Mode Controller for DC Motor Drive, Specification Sheet, UC1637/UC2637/UC 3637, Aug. 1985.
Unitrode Corp., Switched Mode Controller for DC Motor Drive, UC 1637/UC2637/UC 3637, Application Note, U-102, p. 301-311.

Primary Examiner—Steven L. Stephan
Assistant Examiner—David L. Robertson
Attorney, Agent, or Firm—Poms, Smith, Lande & Rose

[57] ABSTRACT

The power amplifier for the head positioning coil of a Winchester or hard disk drive digital storage system includes circuitry for generating complementary variable width pulses at a frequency above 100 kilohertz. The filter coupling the positive and negative power pulses to the head positioner coil includes two oppositely poled coils mounted on a single enclosing coil to avoid D.C. saturation and to maintain high inductance for high frequency noise filtering. Circuitry is also provided for improving the common mode noise rejection capability of the feedback circuit, and the head retract circuitry.

22 Claims, 4 Drawing Sheets

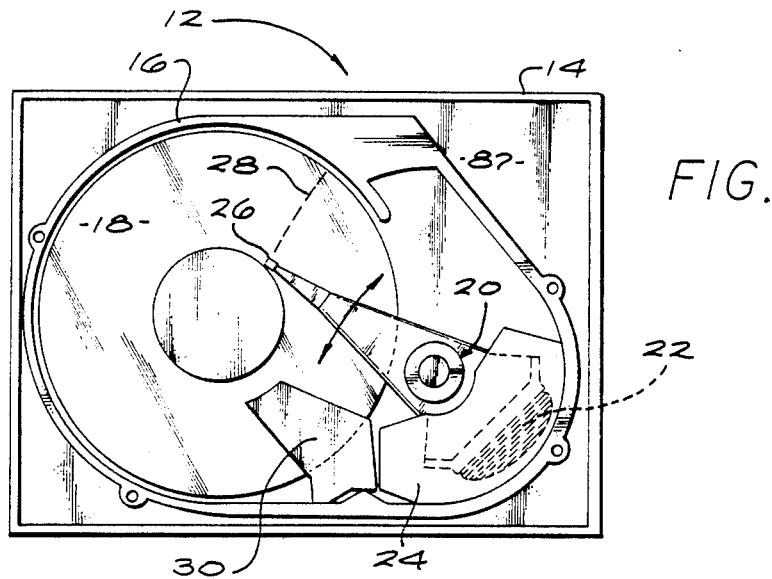
FIG. 1
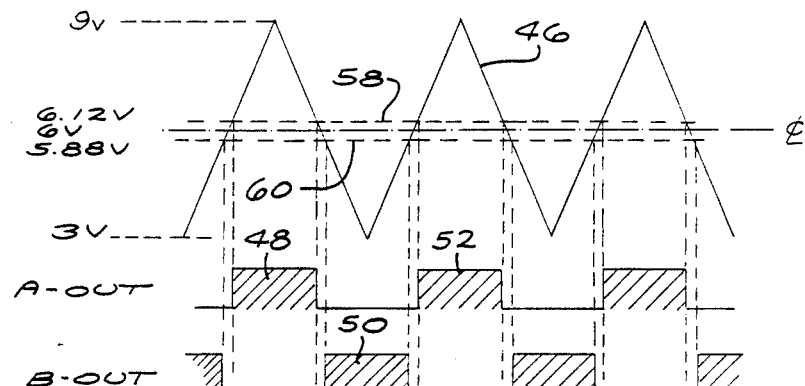
FIG. 3A
FIG. 3B
FIG. 3C
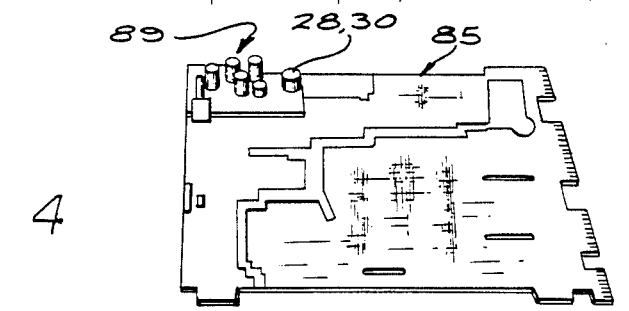
FIG. 4

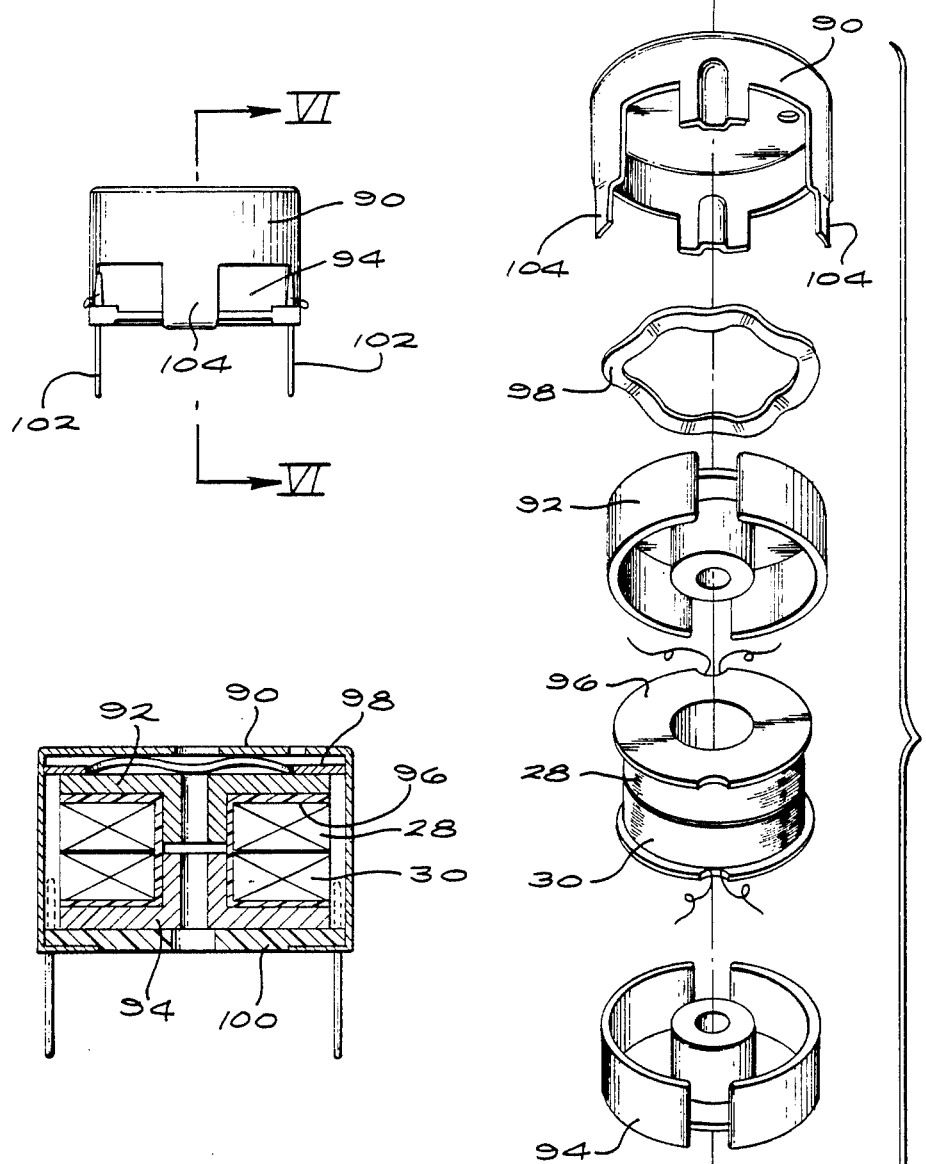
FIG. 5
FIG. 6
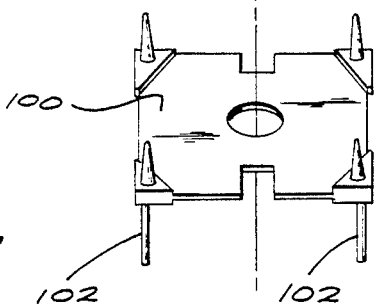
FIG. 7

EFFICIENT HEAD POSITIONER POWER AMPLIFIER

BACKGROUND OF THE INVENTION

This invention relates to Winchester or hard disk digital storage systems, and more particularly to circuitry for powering the head positioner coil. In such storage systems, digital data is stored in the form of magnetic energization on a series of concentric closely spaced tracks on rigid disks having magnetizable surfaces. Data is applied to, and retrieved from, the rotating disks by magnetic heads, which are mounted on a head positioner assembly, and are moved from track to track by the energization of a coil. The coil normally interacts with a permanent magnet structure; and the application of current to the coil in one polarity rotates the head positioner assembly in one direction, to shift the magnetic heads in one direction to different tracks, while current of the opposite polarity shifts the head positioner and heads in the opposite direction.

Now, as the development of Winchester disk drive systems has progressed, more and more data is being stored in relatively small units, with the storage of more than 300 Megabytes of digital information in a standard five-inch drive of the size of a floppy disk drive, now becoming more common. With this higher density of storage, less space is available for cooling fans, heat sinks, or for large inductors or capacitors for filters, for example.

Concerning arrangements for energizing the head positioner coil, most disk drive manufacturers use linear Class A-B power amplifiers in an H-Bridge configuration. Some isolated disk drive manufacturers use linear, Class A head positioner circuitry when the heads are being maintained on a selected track; and when the drive system is switching from track to track, in the "seek" mode, some low frequency switching power amplifier schemes have been employed.

Now, linear Class A amplifiers have good input-output characteristics, having no zero cross-over distortion. However, Class A amplifiers have low power efficiency in terms of power supplied to the head positioner coil, as compared with input power. Class A-B amplifiers are somewhat more efficient, but are subject to zero cross-over distortion as switching from one polarity voltage to another occurs. In each case, the power supply current would be substantially the same as that delivered to the load. Thus, if the voltage supply is at 12 volts, and 1.0 ampere current at 2.0 volts is being supplied to the coil, with the power being 2.0 watts, at least 1.0 amperes current will be drawn from the 12 volt power supply, thus involving 12 watts, and requiring the dissipation of 10 watts in the amplifier. With the substantial power dissipation in the output stages, heat sinking is required.

Low frequency pulse width switching modulation power amplifier circuits are known for the powering of direct current motors, and one prior art patent disclosing such a circuit is M. Gotou, U.S. Pat. No. 4,359,674, granted Nov. 16, 1982. In addition, a switched mode controller circuit for a D.C. Servo Motor intended to be operated in both directions is disclosed in a publication of Unitrode Company, 5 Forbes Road, Lexington, Mass., manufacturer of I.C. chips designated "UC 1637/2837/3637, Switched Mode Controller for D.C. Motor Drive", and an associated application note. However, efficient pulse width modulation switching circuits normally require large size filtering components, such as inductors and capacitors, and such circuits generate switching transients which could interfere with digital data recording and retrieval. In view of the severe space constraints and high frequency noise susceptibility of the low level, high frequency data signals present in Winchester drives to electromagnetic and radio frequency interference, pulse width modulation power amplifiers have generally not been employed in Winchester or hard disk drive digital storage systems.

Accordingly, a principal object of the present invention is to provide a Winchester disk drive head positioner power amplifier circuit which (1) is a linear transconductance power amplifier in its response, (2) has high power efficiency, and (3) does not generate high levels of E.M.I. (electromagnetic interference) or R.F.I. (radio frequency interferences) from switching.

SUMMARY OF THE INVENTION

In accordance with a specific circuit illustrating the principles of the present invention, four power transistors are arranged in an H-bridge configuration, and are switched at a frequency above 150 kilohertz, by a pulse width modulation circuit with a complementary variable duty cycle for the two pairs of transistors to provide a net positive or negative output current to the head positioner coil through filter circuitry including oppositely wound coils on a single core, electrically connected on opposite sides of, and leading to the head positioning coil.

By this unusual arrangement, it has been determined that high efficiency, pulse width modulation, power amplifier principles may be applied to the actuation of the head positioning coil, even where rapid reversal of current must be accomplished. The operation of the oppositely wound coils mentioned above is particularly of interest, with these coils receiving, respectively, pulses of one polarity, and of the other polarity, of complementary, different widths, and with a net D.C. current flowing through the head positioning coil and through the two coils. With the two coils in the filter circuitry being opposed, there is no saturation in the core on which they are mounted, from a D.C. standpoint. From an A.C. standpoint, the narrow width pulses which are not predominating, and all high frequency components will see an unsaturated coil, and therefore high inductance, and will be filtered out. It is noted in passing that if an attempt were made to implement this circuit with uncoupled filter coils, the required physical size of the inductors would be very large so that they would not saturate with the D.C. current flow. Accordingly, with the extremely limited space available within a hard disk drive assembly, such a circuit would not be a preferred alternative.

In one specific implementation of the circuit, an oscillator chip may be employed which has a pair of complementary on-off outputs, with the duty cycle of the two outputs being shifted linearly in accordance with a control input signal. The complementary output signals are coupled to two of the transistors (N-channel MOSFETS) in a power MOSFET (Metal Oxide Semiconductor Field Effect Transistors) H-Bridge output stage. The drains of these two input transistors are respectively cross-coupled to the gates of the second pair of complementary (P-channel MOSFET) transistors in the bridge. Accordingly, the pulse width modulator integrated circuit chip only has to drive one set of transistors. The H-bridge outputs are connected to the filter circuit including the oppositely poled coils mentioned above, and associated capacitors which together form the low pass filter circuit.

The oppositely poled coils may be mounted in a closed configuration with a central ferrite core with a small gap, and an enclosing ferrite cup or housing, thereby avoiding undesired EMI (Electro Magnetic Interference) relative to the high frequency, low level digital data signals being processed within the hard disk assembly. Operating at about 200 kilohertz, the size of the dual coil assembly is quite small, less than one-half inch in diamter and ⅜ inch high, with a recent design reducing the linear dimensions of this coil by more than fifty percent.

An important advantage of the present invention is that, from an input/output standpoint, this head positioner power amplifier operates in the manner of a linear Class AB transconductance amplifier, but has much higher efficiency, and no zero cross-over distortion. Efficiency is approximately 70 to 80 percent, as compared with about 30 to 40 percent for a comparable conventional linear amplifier. In addition, a relatively high frequency response is achieved.

Another aspect of the invention involves the coil current sense feedback amplifier circuit intercoupling the output from the filter circuit (input to head positioner coil) with the compensation amplifier circuit which controls input to the switch mode controller chip. First and second leads from the respective first and second oppositely poled coils are connected respectively to the positive and negative inputs of a differential amplifier in the feedback loop. The resultant feedback amplifier circuit has an exceptional common-mode noise rejection capability.

Another collateral advantage of the present power amplifier for the head positioner coil is that, during deceleration from a high coast velocity, the switching mode amplifier system takes advantage of the back EMF generated by the head positioner coil, which effectively adds to the power supply voltage to further reduce the duty cycle of the pulse width modulation of the output stage. Thus, current generated by coil back-EMF voltage is effectively used for braking during decleration, thereby substantially reducing current being drawn from the power supply. Incidentally, this method of power saving is not possible with a linear Class AB power amplifier.

One collateral aspect of the invention involves a retract circuit which comes into play upon a "shut-down" command. It is desirable when the drive is being shut down or turned off to shift the head positioner coil to one extreme angular orientation, so that the magnetic heads which normally "fly" slightly above the surface of the disks, will "land" on a preselected inner area of the disks. To accomplish this function, the H-bridge circuitry is bypassed, and back EMF from the main drive disk rotation motor (spindle motor) is coupled to the head positioning coil, to actuate it to the desired position, using a low voltage overhead constant current retract circuit.

Other objects, features, and advantages will become apparent from a consideration of the following detailed description and from the accompanying drawings.

BRIEF DESCRIPTION OF THE DRAWINGS

FIG. 1 is a cut-away view of a Winchester or hard disk drive assembly;

FIG. 3(A-C) a diagram showing certain wave forms which are involved in the circuit of FIG. 2;

FIG. 4 shows a printed circuit board employed in connection with the hard disk drive of FIG. 1, and bearing the circuit components of FIGS. 2A and 2B;

FIG. 5 is a side view of a coil assembly including two oppositely-poled coils on a single core, as shown in the circuit of FIG. 2B;

FIG. 6 ils a cross-sectional view of the coil assembly of FIG. 5 taken through the axis thereof; and FIG. 7 is an exploded perspective view of the coil assembly of FIGS. 5 and 6.

BRIEF DESCRIPTION OF PREFERRED EMBODIMENT

Figure 2A:
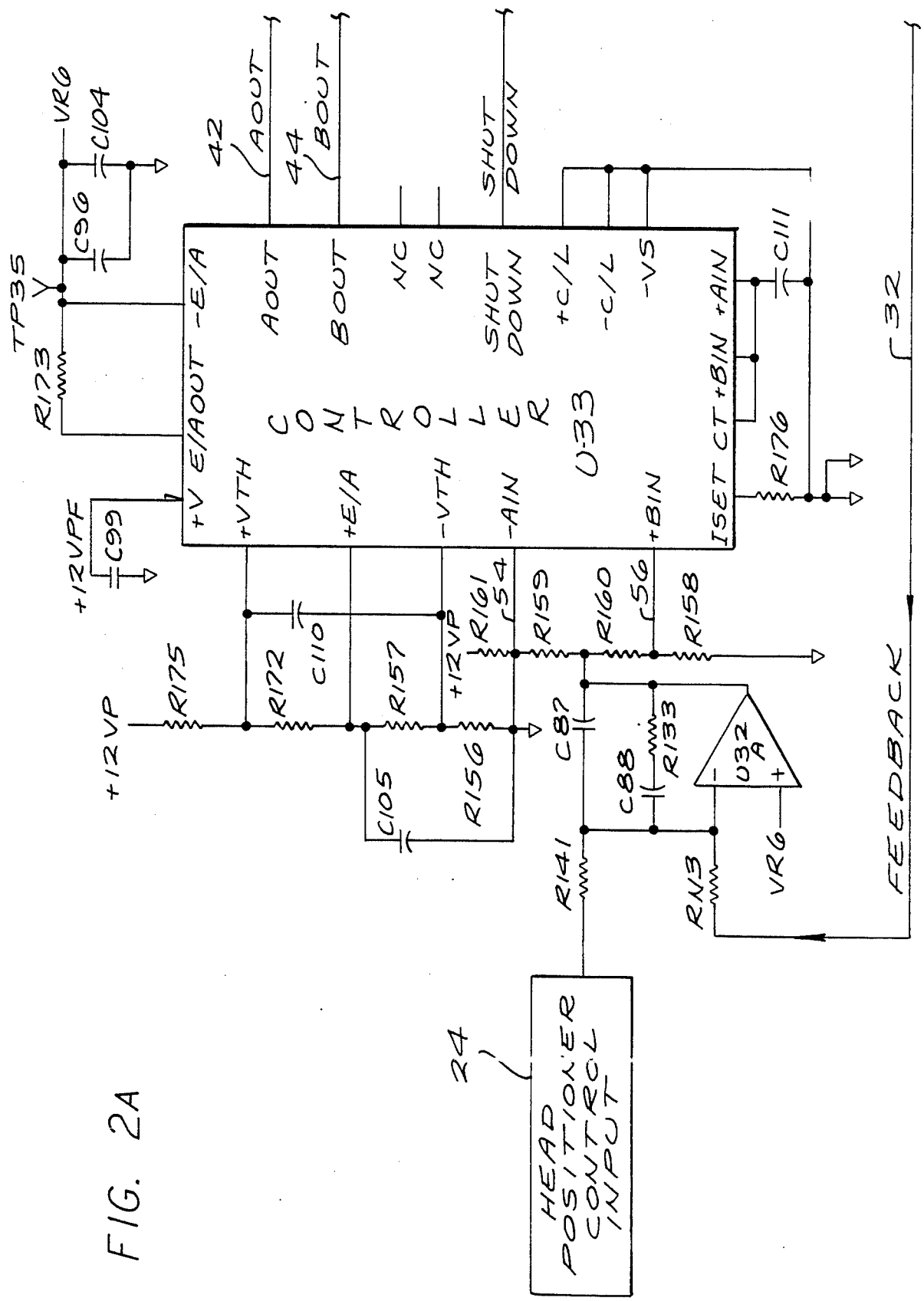
FIGS. 2A and 2B are detailed circuit diagrams of an electric circuit illustrating the principles of the present invention.

Referring more particularly to the drawings, FIG. 1 is a cut-away view of a Winchester or hard disk drive 12 including an outer frame 14, and the inner hard disk drive assembly (HDA) 16 which is mounted resiliently from the frame 14. The hard disk assembly 16 includes a stack of hard disks 18 which in practice are rotated at a relatively high speed, and the head positioner assembly 20. The head positioner assembly 20 is provided with a coil 22 which rotates within a permanent magnet structure 24 to move the magnetic heads, such as the head 26, across the surface of the disks 18, as indicated by the dashed line 28. When the coil 22 is energized in one direction, the heads are moved toward the center of the disks 18, and when the coil 22 is energized in the opposite direction, force is provided to rotate the heads in the opposite direction toward the outer periphery of the disks 18. The structure 30 is an air filter.

Figure 2B:
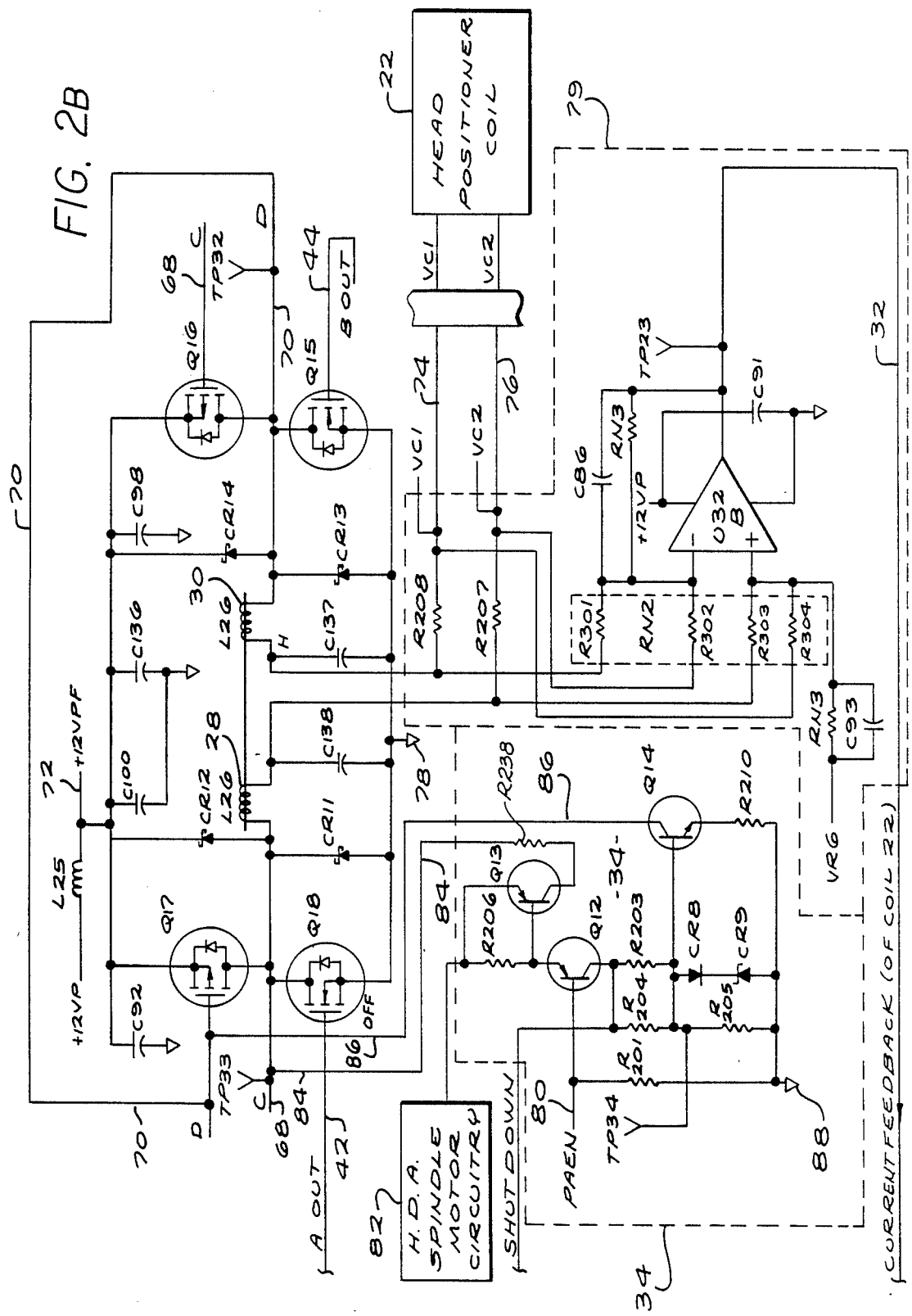

FIGS. 2A and 2B will now be considered, and the mode of operation of this circuit is illustrative of the principles of the present invention.

Now, considering the circuit of FIGS. 2A and 2B, the overall configuration of the circuit will initially be considered. Note that at the far right of FIG. 2B is the head positioner coil 22, which is mounted on the head positioner assembly 20 of FIG. 1. At the far left in FIG. 2A is the head positioner control input 24, which is developed in a known manner, not the subject of the present patent application. The chip U-33, which appears in FIG. 2A is available from Unitrode Corporation and is described in some detail in material from Unitrode Corporation entitled, "Linear Integrated Circuits—Switched Mode Controller for DC Motor Drive". In the upper portion of FIG. 2B are four power MOSFET transistors Q15, Q16, Q17 and Q18. These may be purchased under the following part numbers: IRFR020 and IRFR9020 referring to n-type and p-type transistors, respectively. These are operated alternately in accordance with the "A" and "B" outputs from chip U-33 which have complementary variable duty cycle pulses, with "A" being on when "B" is off, and vice-versa. When Q15 and Q17 are energized, current flows toward the head positioner coil 22 in one direction and when power transistors Q16 and Q18 are turned on, current flows toward the head positioner coil 22 in the opposite direction, with the net flow of DC current through the coil 22 being determined by the duration of the pulses turning one pair of power transistors on, as compared with the duration of the complementary pulses turning the other pair of power transistors on. With a 50% duty cycle, no current will flow through the head positioning coil 22. The two coils 28 and 30 form part of the filtering circuit for directing current to the head positioner coil 22, and these coils 28 and 30 are mounted on a single core, for reasons which will be developed in greater detail hereinbelow.

At the lower right in FIG. 2B is the operational amplifier U-32B which senses the current applied to the head positioner coil, and provides a feedback signal on lead 32 to the operational amplifier designated U-32A, at the lower left in FIG. 2A. The circuitry 79 directly associated with the amplifier U-32B is enclosed with a dashed line block.

At the lower left in FIG. 2B is the circuit 34 involving retraction of the heads during shutdown.

Now that the overall layout and mode of operation of the circuit of FIGS. 2A and 2B has been outlined, consideration will be given to some of the circuits in slightly greater detail. Initially, the circuits associated with the chip UC3637, otherwise designated U-33, will be considered. The frequency of oscillation of the oscillator included within chip U-33 is set to be about 200 kilohertz. This is accomplished by establishing the values of the resistor R176 and the capacitor C-111. The frequency is also determined in part by the values of the resistive network including resistors R156, R157, R172 and R175, and capacitor C105. The additional components shown toward the top of chip U-33 are for stabilization and compensation of the voltage reference source VR6.

It may be noted that, at the right of the chip U-33, in FIG. 2A, lead 42 is designated "A-Out" and lead 44 is designated "B-Out". Similarly, in FIG. 2B, leads 42 and 44 are identified in the same manner, but it may be noted that in FIG. 2B, lead 44 comes in from the right to the gate electrode of the MOSFET transistor Q15.

FIGS. 3A, 3B and 3C indicate the nature of the formation of the complementary pulses which appear at the A-Out and B-Out leads, and how they change in accordance with the signals from the head positioner control input 24 and from the feedback signal on lead 32. More specifically, within the chip U-33, a triangular waveform such as that shown at 46 in FIG. 3A is developed. Comparator circuits are provided so that when the triangular waveform 46 exceeds a predetermined level, such as 6.12 volts, a comparator is operated, and an output pulse appears as shown at A-Out in FIG. 3B. Similarly, when the wave form 46 drops below 5.88 volts, an output pulse is produced as indicated at B-Out in FIG. 3B. It may be noted that there is a slight dead space between the time when the pulse 48 at A-Out terminates, and the pulse 50 from B-Out is initiated. Similarly, there is a slight dead space between the time when the pulse 50 ends, and the time when the next A-Out pulse 52 starts.

Now, the effect of changes at the inputs at leads 54 and 56 to the chip U-33 is to shift the trip voltage thresholds up or down, relative to the triangular waveform, as indicated by the horizontal lines 58 and 60, as shown in FIG. 3A. The result of such shifting is shown in FIG. 3C, wherein the A-Out pulses shown at 62 are much longer than the B-Out pulses shown at 64. When the input control voltages swing in the opposite direction, of course, the A-Out pulses would become shorter, and the B-Out pulses longer, just the opposite of the situation as shown in FIG. 3C. FIG. 3B shows the 50% duty cycle case, when no current is applied to coil 22.

Returning to FIGS. 2A and 2B, we have noted that the A-Out signals on lead 42 are applied to the gate electrode of MOSFET transistor Q18, and the B-Out signals are applied on lead 44 to the gate electrode of Q15. It may also be noted that the drain electrode of Q18 is connected on lead 68 to the gate electrode (C) of transistor Q16, so that as soon as transistor Q18 turns on, Q16 is also energized, completing the path through the head positioner coil. Similarly, when B-Out is energized to turn Q15 on, the drain of Q15 is connected via lead 70 (D) to the gate of transistor Q17.

Now, when A-Out is energized, transistors Q18 and Q16 turn on, and the path from the 12 volt supply 72 is completed through transistor Q16, the filter circuit including the coil 30 and lead 74 to the head positioner coil. Returning from the head positioner coil, the circuit extends through lead 76, the oppositely poled coil 28, through transistor Q18, and then to ground at point 78. When A-Out turns off transistors Q16 and Q18, and the complementary B-Out signal turns on transistors Q15 and Q17, the path is completed in the other direction through the head positioner coil from 12 volt source 72 through transistor Q17, the coil 28, and over lead 76 to the head positioner coil 22. Then, the return path to ground goes through lead 74, the other coil 30, and then through transistor Q15 to ground point 78.

In practice, the coils 28 and 30 are uniquely intercoupled, so as to provide good filtering action in combination with the associated capacitors C137 and 138. The two coils 28 and 30 are mounted on the same core. More specifically, with the two coils 28 and 30 being oppositely poled on the single core structure, the core is maintained unsaturated, so that, from an alternating current standpoint, high inductance is encountered, with the result that the high frequency AC components of the wave forms as shown in FIG. 3C, for example, are completely filtered out. As mentioned above, without this type of coil configuration, very large inductances would be required to both carry the fairly high current and also to avoid saturation, as a result of the D.C. current flow. With the limited space within the hard disk assembly, it is most desirable to reduce the size of components as much as possible, and one way that this is accomplished in the present case is to use the oppositely poled inductors mounted on a single core. Incidentally, the diodes shown associated with the MOSFET transistors, serve to discharge the gate capacitance rapidly and permit the turnoff of these transistors promptly in accordance with the A-Out and B-Out signals. The diodes also limit the inductive kickback voltage generated by the head positioner coil 22.

Turing at this point to the feedback circuit 79 involving operational amplifier U-32B and lead 32, the negative and positive inputs to the operational amplifier are coupled to the leads 76 and 74, respectively, leading to the head positioning coil 22. By this circuit configuration, high frequency noise and ripple signals are eliminated in view of the common mode rejection capability of this circuitry. In considering the inputs to differential amplifier 32B in greater detail, they include resistors R-301 and R-302 connected to the negative input to amplifier U-32B and resistors R-303 and R-304 connected to the positive input to amplifier U-32B. The circuit consists of two voltage dividers on the input of U-32B. R-301 and R-302 form one divider, and R-303 and R-304 form the other. These four resistors center the signal from R-207 and R-208 in the middle of the common mode range of operational amplifier U-32B.

When no current is flowing in head positioner coil 22, then the four resistors R-301, R-302 and R-303, R-304 are constantly dividing the small amplitude 200KHZ switching frequency so that both inputs are at a voltage level that is one-half the power supply voltage. This means that, with the greatly attenuated 200KHZ switching signal via coils 28, 30, and capacitors C-137, C-138, there will be no error signal fed back on lead 32.

When current in the head positioner coil 22 is increased, the voltages now developed across sense resistors R-207 and R-208 are fed into the amplifier U-32B via R-302, R-303 and R-301, R-304, respectively, still centered about the common mode range of U-32B. The input voltages at U-32B will always be in the center of the common mode range of amplifier U-32B with either directions of current flow through the head position coil 22. In each case, the resistive networks are connected to opposite sides of the coil 22, and to the coil side and the remote side (away from the coil) of the respective resistors R-207 and R-208, to eliminate high frequency voltage swings. However, as current flows through coil 22, a small voltage is generated across resistors R-207 and R-208, (each about 0.2 ohms) and these small voltages provide a small differential voltage at the inputs to amplifier U32B.

Consideration will now be given to the retract circuit 34, which comes into play when the system is turned off. Normally, Q12 is held off, with the input at lead 80 being high. However, when the system is being shut down, the input at lead 80 goes low, and transistors Q12, Q13, and Q14 are turned on, while all of transistors Q15 through Q18 are turned off. Back EMF is supplied from the hard disk assembly spindle motor circuitry 82 to power the head positioner coil 22 to its retracted position. This circuit extends from circuit 82 through transistor Q13, along lead 84, through resistor R-238, through coil 28, along lead 76 through the coil 22, back through lead 74, through coil 30, along lead 70 through lead 86 and down through transistor Q14 and retract current setting resistor R210, to the ground point 88. With this arrangement, the head positioner coil 22 is shifted to its proper extreme position so that the magnetic heads land in the inner landing zone area of the disks. Accordingly, a low voltage overhead, constant current retract circuit has been provided.

Circuitry associated with the hard disk assembly, including that of FIGS. 2A and 2B, is mounted on the printed circuit board 85 of FIG. 4. This circuit board 85 is mounted on top of the HDA 16 and frame 14 assembly of FIG. 1. It may be noted that there is some space in the area 87 between the irregularly shaped HDA and the rectangular frame. Certain components of the circuitry, such as the coils 28, 30 of FIG. 2B necessarily take up a substantial volume of space. They are therefore located at one corner 89 of the printed circuit board 85, and this corner is assembled with the HDA 16 and frame 14 so that the protruding components extend into the space 87. The coils 28, 30 form one of the protruding assemblies mounted at corner 89 of printed circuit board 85.

FIGS. 5, 6 and 7 show the physical configuration of the coil assembly which has been designated by the reference numerals 28 and 30 in FIG. 2B. More specifically, referring to FIGS. 5, 6, and 7, the coil assembly includes an outer aluminum shielding can or housing 90, a two-part ferrite core, including an upper portion 92, and a lower portion 94, which are closely associated with the two coils 28 and 30, mounted on a spool 96 which has an open center through which the center core of each of the two cup-shaped ferrite members 92 and 94 penetrate. It is understood that a slight gap is provided between the two central portions of core members 92 and 94, for magnetic property purposes. A spring washer 98 is provided between the core element 92 and the can 90. A reinforced polyester plate 100 has electrical contacts 102 extending downwardly therefrom, and the depending metal arms 104 from the can 90 lock over the reinforced polyester base 100 to secure the assembly together.

In conclusion, it is to be understood that the foregoing detailed description and the accompanying drawings relate to one preferred embodiment of the invention. However, variations may be employed without departing from the scope of the invention. Thus, by way of example and not of limitation, the coils 28 and 30 may be mounted on a common core in other geometric configurations, other than that shown in FIGS. 5 through 7. Similarly, the oscillator for providing pulse width modulation may be implemented in another manner other than by the use of the UC-3637 chip. Frequency has been disclosed as being approximately 200 kilohertz, but frequencies from approximately 100 kilohertz up to 1 megahertz are contemplated, with higher frequencies being preferred on the basis of reducing further the size of the filtering components which are required However, the speed of operation of the MOSFET transistors is a somewhat limiting factor at the present time, with the contemplation that as higher speed transistors become available, higher oscillator frequencies will be employed. It is further noted that the present invention is applicable to other types of digital storage systems, such as floppy disk systems, optical disk systems, and digital magnetic tape drives. Accordingly, the present invention is not limited to the embodiments precisely as shown and described hereinabove.

What is claimed is:

1. A disk drive digital storage system including an efficient power amplifier for the head positioner, comprising:
   means for providing first and second substantially complementary pulse width modulated signals at a frequency above 100 kilohertz;
   means for varying the pulse width in accordance with input control signals;
   a head positioner assembly including a head positioner coil;
   means including filter circuitry for applying unidirectional current to said head positioner coil;
   H-bridge circuit means including first and second pairs of power transistors;
   means for controlling said first and second pairs of power transistors, respectively, by said first and second complementary pulse width modulated signals, to apply power pulses to said filter circuitry in one direction or the other;
   said filter circuitry including a first coil for receiving pulses from the first of said pairs of power transistors and a second coil for receiving pulses from the second of said pairs of power transistors; and
   means for mounting said first and second filter coils on a single core with the coils opposed so that the opposing flux from the unidirectional head positioner coil current flowing through both coils maintains the core unsaturated to provide high inductance to block high frequency pulse signal components from the head positioner coil;

whereby, from an input-output standpoint, said amplifier operates in the manner of a linear Class AB transconductance amplifier with no zero crossover distortion; and during deceleration, the back EMF from the head positioner coil reduces the duty cycle of pulse width modulation and the power requirements of the system.

2. A system as defined in claim 1 wherein said system includes hard storage disks, and a main drive motor for rotating said hard disks, and wherein circuit means are provided for applying back EMF from said main drive motor, upon the receipt of a "shut-down" signal, to the head positioner coil to retract the magnetic heads by shifting the head positioner assembly to one extreme position, whereby during deceleration, the back EMF from the head positioner coil reduces the duty cycle of pulse width modulation and the power requirements of the system.

3. A system as defined in claim 1 wherein said transistors are field effect transistors, wherein said pulse width modulated signals are applied respectively to the gate electrode of one transistor of each of said pairs, and wherein the drain electrode of each said transistor is coupled to the gate electrode of a second transistor of each said pair of transistors.

4. A system as defined in claim 1 including a feedback circuit coupled from the two sides of said head positioner coil to circuitry coupled to the means for varying said pulse width; said feedback circuit including an operational amplifier having a positive input and a negative input coupled respectively to the two sides of said head positioning coil, whereby the common mode noise signal rejection capability of said feedback circuit is increased.

5. A system as defined in claim 4 wherein said head positioning coil has a first and second low resistance resistors in series with it on the two sides thereof, and wherein (a) said negative input to said amplifier has as inputs a third resistor connected to the coil side of said first resistor and a fourth resistor connected to the remote side of said second resistor; and (b) said positive input to said amplifier has as inputs a fifth resistor connected to the coil side of said second resistor and a sixth resistor connected to the remote side of said second resistor.

6. A system as defined in claim 1 wherein said single core encloses both of said coils, to reduce high frequency radiation.

7. A system as defined in claim 6 further comprising a conductive can enclosing said core and said filter coils.

8. A system as defined in claim wherein said transistors are power MOSFET transistors.

9. A system as defined in claim 1 wherein said system includes means for varying the direct current through said head positioner coil substantially linearly with said input control signals.

10. A disk drive digital storage system including an efficient power amplifier for the head positioner, comprising:

means including a plurality of hard disks for storing digital data;
a main drive motor for rotating said disks;
a plurality of magnetic heads for reading and writing data with respect to said disks;

means for providing first and second substantially complementary pulse width modulated signals at a frequency above 100 kilohertz;
means for varying the pulse width in accordance with input control signals;
a head positioner assembly including a head positioner coil, said magnetic heads being mounted on said head positioner assembly;
means including filter circuitry for applying unidirectional current to said head positioner coil;
H-bridge circuit means including first and second pairs of power transistors;
means for controlling said first and second pairs of power transistors, respectively, by said first and second complementary pulse width modulated signals, to apply power pulses to said filter circuitry in one direction or the other;
said filter circuitry including a first coil for receiving pulses from the first of said pairs of power transistors and a second coil for receiving pulses from the second of said pairs of power transistors;
means for mounting said first and second coils in said filter circuitry on a single core with the coils opposed so that the opposing flux from unidirectional positioner coil current flowing through both coils maintains the core unsaturated to provide high inductance to block high frequency pulse signal components from the positioner coil;
circuit means for applying back EMF from said main drive motor, upon the receipt of a "shut-down" signal, to the head positioner coil to retract the magnetic heads by shifting the head positioner assembly to one extreme position; and for concurrently turning off both of said two pairs of transistors; and
feedback circuit means coupled from the two sides of said head positioner coil to the means for varying said pulse width; said feedback circuit including an operational amplifier having a positive input and a negative input coupled respectively to the two sides of said head positioning coil, whereby the common mode noise signal rejection capability of said feedback circuit is increased.

11. A system as defined in claim 10 wherein said transistors are field effect transistors, wherein said pulse width modulated signals are applied respectively to the gate electrode of one transistor of each of said pairs, and wherein the drain electrode of each said transistor is coupled to the gate electrode of a second transistor of each said pair of transistors.

12. A system as defined in claim 10 wherein said single core encloses both of said coils, to reduce high frequency radiation.

13. A disk drive digital storage system including an efficient power amplifier for the head positioner, comprising:

means including a plurality of hard disks for storing digital data;
a main drive motor for rotating said disks;
a plurality of magnetic heads for reading and writing data with respect to said disks;
means for providing first and second substantially complementary pulse width modulated signals at a frequency above 100 kilohertz;
means for varying the pulse width in accordance with input control signals;

a head positioner assembly including a head positioner coil, said magnetic heads being mounted on said head positioner assembly;

means including filter circuitry for applying unidirectional current to said head positioner coil;

means for applying power pulses to said filter circuitry in one direction or the other under the control of said first and second complementary pulse width modulated signals, respectively;

said filter circuitry including a first coil for receiving pulses applied to said filter circuitry in one direction and a second coil for receiving pulses applied to said filter circuitry in the opposite direction; and means for mounting said first and second filter coils on a single core with the coils opposed so that the opposing flux from unidirectional positioner coil current flowing through both coils maintains the core unsaturated to provide high inductance to block high frequency pulse signal components from the positioner coil.

14. A system as defined in claim 13 wherein said transistors are field effect transistors, wherein said pulse width modulated signals are applied respectively to the gate electrode of one transistor of each of said pairs, and wherein the drain electrode of each said transistor is coupled to the gate electrode of a second transistor of each said pair of transistors.

15. A system as defined in claim 13 including a feedback circuit coupled from the two sides of said head positioner coil to circuitry coupled to the means for varying said pulse width; said feedback circuit including an operational amplifier having a positive input and a negative input coupled respectively to the two sides of said head positioning coil, whereby the common mode noise signal rejection capability of said feedback circuit is increased.

16. A system as defined in claim 13 wherein said single core encloses both of said coils, to reduce high frequency radiation.

17. A disk drive digital storage system including an efficient power amplifier for the head positioner, comprising:

means including a plurality of disks for storing digital data;

a main drive motor for rotating said disks;

a plurality of heads for reading and writing data with respect to said disks;

means for providing first and second substantially complementary pulse width modulated signals at a frequency above 100 kilohertz;

means for varying the pulse width in accordance with input control signals;

a head positioner assembly including a head positioner coil, said heads being mounted on said head positioner assembly;

means including filter circuitry for applying unidirectional current to said head positioner coil;

means for applying power pulses to said filter circuitry in one direction or the other under the control of said first and second complementary pulse width modulated signals, respectively;

said filter circuitry including a first coil for receiving pulses applied to said filter circuitry in one direction and a second coil for receiving pulses applied to said filter circuitry in the opposite direction; and means for suppressing high frequency radiation from said pulses, whereby there is no adverse effect on the storage and retrieval of digital data.

18. A system as defined in claim 17 wherein said means for suppressing high frequency radiation includes first and second coils in said filter circuitry, said coils being fully enclosed by an enclosing magnetic core structure, and said coils being poled in opposition to one-another on said core structure.

19. A system as defined in claim 17 including a feedback circuit coupled from the two sides of said head positioner coil to circuitry coupled to the means for varying said pulse width; said feedback circuit including an operational amplifier having a positive input and a negative input coupled respectively to the two sides of said head positioning coil, whereby the common mode noise signal rejection capability of said feedback circuit is increased.

20. A system as defined in claim 17 wherein said system includes means for varying the direct current through said head positioner coil substantially linearly with said input control signals.

21. A system as defined in claim 17 wherein said means for applying power pulses to said filter circuitry includes two pairs of power field effect transistors, and wherein means are provided for applying said pulse width modulated signals to the gate electrode of one transistor of each said pair of transistors, and wherein the drain electrode of each said transistor is coupled to the gate electrode of the other transistor or each said pair of transistors.

22. A disk drive digital storage system including an efficient power amplifier for the head positioner, comprising:

means including a plurality of hard disks for storing digital data;

a main drive motor for rotating said disks;

a plurality of magnetic heads for reading and writing data with respect to said disks;

means for providing first and second substantially complementary pulse width modulated signals at a frequency above 100 kilohertz;

means for varying the pulse width in accordance with input control signals;

a head positioner assembly including a head positioner coil, said magnetic heads being mounted on said head positioner assembly;

means including filter circuitry for applying unidirectional current to said head positioner coil;

means for applying power pulses to said filter circuitry in one direction or the other under the control of said first and second complementary pulse width modulated signals, respectively;

a feedback circuit coupled from the two sides of said head positioner coil to circuitry coupled to the means for varying said pulse width; said feedback circuit including an operational amplifier having a positive input and a negative input coupled respectively to the two sides of said head positioning coil;

said head positioning coil having a first and second low resistance resistors in series with it on the two sides thereof, and wherein (a) said negative input to said amplifier has as inputs a third resistor connected to the coil side of said first resistor and a fourth resistor connected to the remote side of said second resistor; and (b) said positive input to said amplifier has as inputs a fifth resistor connected to the coil side of said second resistor and a sixth resistor connected to the remote side of said second resistor, whereby the common mode noise signal rejection capability of said feedback circuit is increased.

* * * * *